United States Patent
Chen et al.

(10) Patent No.: US 8,576,944 B2
(45) Date of Patent: Nov. 5, 2013

(54) SIGNAL TRANSMITTING APPARATUS FOR OFDM SYSTEM AND PARAMETER ADJUSTING METHOD THEREOF

(75) Inventors: Jiunn Tsair Chen, Hsinchu County (TW); Yun Shen Chang, Hsinchu County (TW); Chih Hung Lin, Hsinchu County (TW)

(73) Assignee: Ralink Technology Corporation, Hsinchu County (TW)

( * ) Notice: Subject to any disclaimer, the term of this patent is extended or adjusted under 35 U.S.C. 154(b) by 918 days.

(21) Appl. No.: 12/418,068

(22) Filed: Apr. 3, 2009

(65) Prior Publication Data

US 2009/0262862 A1 Oct. 22, 2009

(30) Foreign Application Priority Data

Apr. 21, 2008 (TW) ................ 97114448 A

(51) Int. Cl.
  *H04K 1/02* (2006.01)
  *H04L 25/03* (2006.01)
  *H04L 25/49* (2006.01)

(52) U.S. Cl.
  USPC ........... 375/297; 375/296; 327/291; 332/106; 341/20; 341/173

(58) Field of Classification Search
  USPC .................... 375/297, 296, 260, 285
  See application file for complete search history.

(56) References Cited

U.S. PATENT DOCUMENTS

| | | | |
|---|---|---|---|
| 5,005,082 A * | 4/1991 | Zdepski et al. | 348/613 |
| 6,081,158 A | 6/2000 | Twitchell et al. | |
| 6,246,865 B1 | 6/2001 | Lee | |
| 7,136,628 B2 | 11/2006 | Yang et al. | |
| 7,268,620 B2 | 9/2007 | Nygren et al. | |
| 7,274,750 B1 | 9/2007 | Mueller | |
| 7,308,042 B2 * | 12/2007 | Jin et al. | 375/297 |
| 7,348,844 B2 * | 3/2008 | Jaenecke | 330/149 |
| 7,899,416 B2 * | 3/2011 | McCallister et al. | 455/114.3 |
| 2001/0006359 A1 * | 7/2001 | Suzuki et al. | 333/14 |
| 2003/0207680 A1 * | 11/2003 | Yang et al. | 455/341 |
| 2004/0136317 A1 * | 7/2004 | Mohan | 370/218 |
| 2007/0296502 A1 | 12/2007 | Zhou | |
| 2008/0118001 A1 * | 5/2008 | Chan et al. | 375/297 |
| 2009/0256630 A1 * | 10/2009 | Brobston | 330/2 |

FOREIGN PATENT DOCUMENTS

| | | |
|---|---|---|
| TW | 200537822 | 11/2005 |
| TW | I258927 | 7/2006 |

OTHER PUBLICATIONS

Xianbin Wang, T.T. Tjhung, and C.S. Ng, "Reduction of Peak-to-Average Power Ratio of OFDM System Using a Companding Technique", IEEE Transactions on broadcasting, vol. 45, No. 3, pp. 303-307, Sep. 1999.*

Tao Jiang, Yang Yang, and Yong-Hua Song, "Exponential Companding Technique for PAPR Reduction in OFDM Systems", IEEE Transactions on broadcasting, vol. 51, No. 2, pp. 244-248, Jun. 2005.*

(Continued)

*Primary Examiner* — Shuwang Liu
*Assistant Examiner* — Gina McKie
(74) *Attorney, Agent, or Firm* — WPAT, P.C.; Anthony King

(57) ABSTRACT

A signal transmitting apparatus for orthogonal frequency division multiplexing (OFDM) system comprises a compandor, a predistortor, a power amplifier and a feedback module. The compandor is configured to compress and expand a transmitted signal. The predistortor is configured to perform a predistortion operation on output signals of the compandor. The power amplifier is configured to amplify output signals of the predistortor. The feedback module is configured to adjust parameters of the compandor and the predistortor based on a feedback signal.

18 Claims, 2 Drawing Sheets

(56) References Cited

OTHER PUBLICATIONS

Tao Jiang and Guangxi Zhu, "Nonlinear Companding Transform for Reducing Peak-to-Average Power Ratio of OFDM Signals", IEEE Transactions on broadcasting, vol. 50, No. 3, pp. 342-346, Sep. 2004.*

Davide Dardari, Velio Tralli, and Alessandro Vaccari, "A theoretical characterization of nonlinear distortion effects in OFDM systems", IEEE Transactions on communications, vol. 48, No. 10, pp. 1755-1764, Oct. 2000.

James K. Cavers, "Amplifier linearization using a digital predistorter with fast adaptation and low memory requirements", IEEE Transactions on vehicular technology, vol. 39, No. 4, pp. 374-382, Nov. 1990.

Kathleen J. Muhonen, Mohsen Kavehrad, and Rajeev Krishnamoorthy, "Look-up table techniques for adaptive digital predistortion: a development and comparison", IEEE Transactions on vehicular technology, vol. 49, No. 5, pp. 1995-2002, Sep. 2000.

Office Action issued on Dec. 30, 2011 from the Taiwanese counterpart application 097114448.

* cited by examiner

SIGNAL TRANSMITTING APPARATUS FOR OFDM SYSTEM AND PARAMETER ADJUSTING METHOD THEREOF

BACKGROUND OF THE INVENTION

1. Field of the Invention

The present invention relates to a signal transmitting apparatus for an orthogonal frequency division multiplexing (OFDM) system, and more particularly, to a signal transmitting apparatus which integrates companding and predistortion operations.

2. Description of the Related Art

The wireless local area network standard IEEE 802.11a/g/n adopts OFDM wireless communication as the standard for wireless communication systems. Generally, an OFDM system has two major problems when transmitting signals. The first problem is related to overlarge peak to average power ratio (PAPR) for transmitting signals, and the second problem is related to a nonlinear problem at the power amplifier.

PAPR is the ratio of peak signal strength to mean signal strength, and the probability of the signal transmitting at peak strength is much less than the probability of the signal transmitting at mean strength. Therefore, to limit the strength of the signal within the effective range of the system, the peak strength cannot exceed the maximum input strength of the system. If the system has an excessive PAPR value, the situation is such that most of the time the output of the signal is too small and the signal transmission efficiency is low.

In another aspect, power amplifiers can be divided into linear and non-linear types. The input to output ratio of the linear power amplifier is a constant, but the input to output ratio of the non-linear power amplifier is not a constant. Therefore, the non-linear power amplifier causes signal distortion. However, because the efficiency of outputting power for the linear power amplifier is far less than for the non-linear power amplifier, i.e., the power consumption of the linear power amplifier is greater than that of the non-linear power amplifier, normal systems usually adopt non-linear power amplifiers.

Traditional transmitting apparatuses of an OFDM system are composed of a baseband signal processing module and a radio frequency (RF) module. The baseband signal processing module is used to handle the PAPR problem, and the RF module is used to handle the non-linear problem of the power amplifier.

A normal solution to resolve the PAPR problem is to use a compandor, which compresses or expands transmitted signals at the transmitter so as to reduce PAPR of the signals. In the receiver an inverse compandor is used to restore the signals. In another respect, a normal solution to resolve the non-linear problem is to use a predistortion technique, which focuses on the input/output relationship of the power amplifier and conducts a predistortion operation on the transmitted signals so as to offset the non-linear effect. In the receiver an inverse predistortion operation is conducted to restore the signals.

Traditional baseband signal processing modules and RF modules handle these two problems separately. That is, these two modules strive for their respective best solutions, but ignore the best solution for the entire structure. Therefore, it is necessary to integrate these two modules in order to increase the efficiency of transmission and outputting power.

SUMMARY OF THE INVENTION

The objective of the present invention is to integrate the companding and predistortion operations for the signal transmitting apparatus of the OFDM system so as to increase the efficiency of signal transmissions.

The signal transmitting apparatus for orthogonal frequency division multiplexing (OFDM) system in accordance with one embodiment of the present invention comprises a compandor, a predistortor, a power amplifier and a feedback module. The compandor is configured to compress and expand a transmitted signal. The predistortor is configured to perform a predistortion operation on output signals of the compandor. The power amplifier is configured to amplify output signals of the predistortor. The feedback module is configured to adjust parameters of the compandor and the predistortor based on a feedback signal.

The signal transmitting apparatus for OFDM system in accordance with one embodiment of the present invention comprises a companding feedback module, a predistortion feedback module and a power amplifier. The companding feedback module is configured to compress and expand a transmitted signal. The predistortion feedback module is configured to perform a predistortion operation on output signals of the companding feedback module and to output a feedback signal to the companding feedback module. The power amplifier is configured to amplify output signals of the predistortion feedback module and to couple the amplified signals to the predistortion feedback module. The companding feedback module and the predistortion feedback module alternatively adjust their parameters.

The method for adjusting parameters of a signal transmitting apparatus for OFDM system in accordance with one embodiment of the present invention comprises the steps of: adjusting parameters of a companding feedback module based on a peak to average power ratio of a transmitted signal and substantive power amplifying of a power amplifier included in the signal transmitting apparatus; and adjusting parameters of a predistortion feedback module based on statistical properties of the transmitted signal and an amplifying ratio of the power amplifier. The companding feedback module and the predistortion feedback module alternatively adjust their parameters until convergence.

BRIEF DESCRIPTION OF THE DRAWINGS

The invention will be described according to the appended drawings in which.

PREFERRED EMBODIMENT OF THE PRESENT INVENTION

Figure 1:
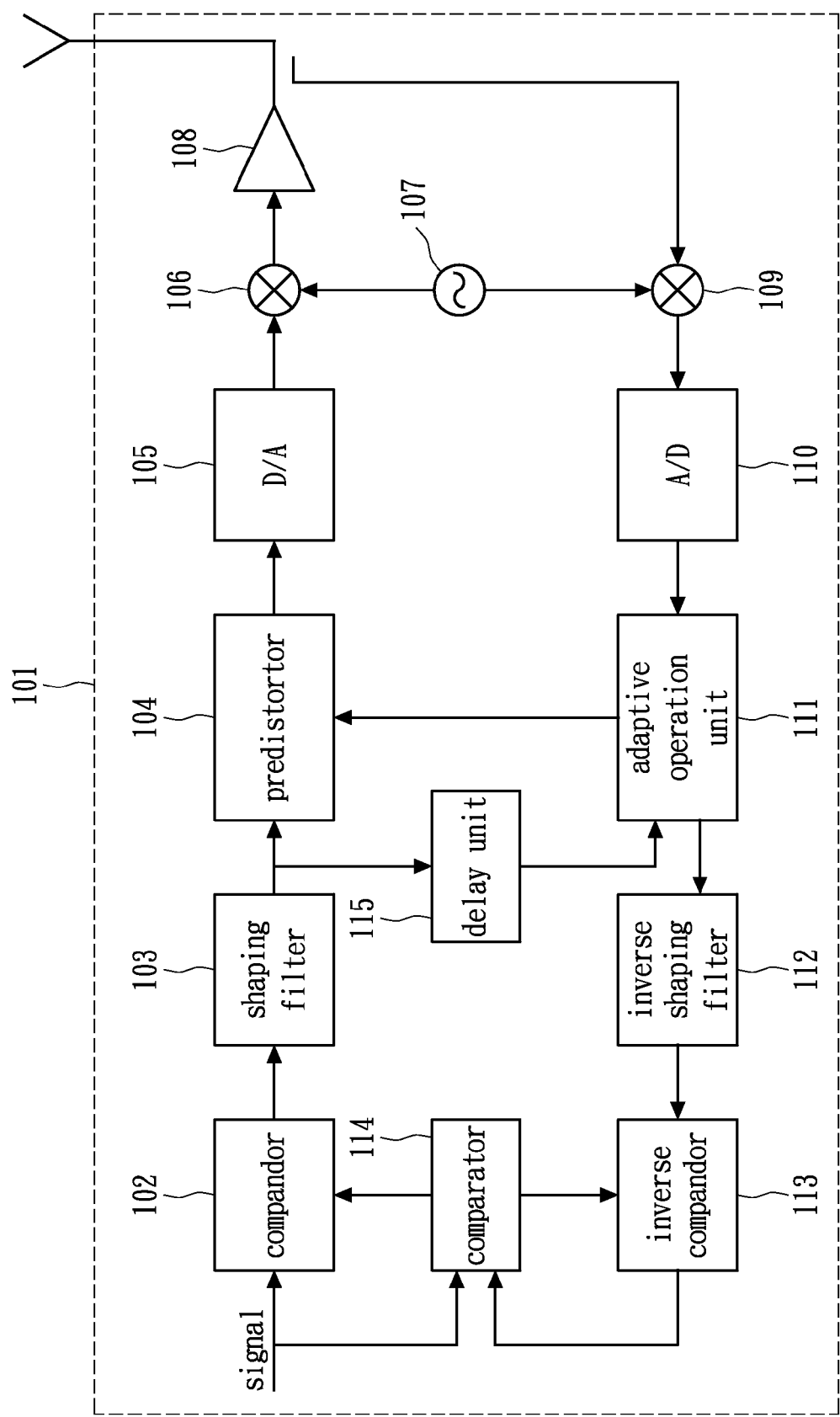
FIG. 1 shows a signal transmitting apparatus in accordance with one embodiment of the present invention.

FIG. 1 shows a signal transmitting apparatus applied to an OFDM system in accordance with one embodiment of the present invention. The signal transmitting apparatus 101 includes a compandor 102, a shaping filter 103, a predistortor 104, a digital-to-analog converter (DAC) 105, a mixer 106, a local oscillator 107, a power amplifier 108, an inverse mixer 109, an analog-to-digital converter (ADC) 110, an adaptive operation unit 111, an inverse shaping filter 112, an inverse compandor 113, a comparator 114 and a delay unit 115. The compandor 102, shaping filter 103, predistortor 104, DAC 105, mixer 106, and power amplifier 108 constitute a signal processing path. The inverse mixer 109, analog-to-digital converter (ADC) 110, adaptive operation unit 111, inverse shaping filter 112 and inverse compandor 113 constitute an inverse feedback path.

The compandor 102 compresses and expands an OFDM signal intended to be transmitted. The shaping filter 103 receives output signals of the compandor 102, and transforms them into transmitted signals of the OFDM system. The predistortor 104 receives the output signals of the shaping filter 103, and conducts a predistortion process. The DAC 105 receives the output signals of the predistortor 104, and transforms them into analog signals. The mixer 106 mixes the analog signals of the DAC 105 and carriers of the local oscillator 107 so as to generate transmitted signals. The power amplifier 108 receives the output signals of the mixer 106 and then amplifies them. The delay unit 115 receives the output signals of the shaping filter 103 and conducts a delay process before outputting the results to the adaptive operation unit 111.

The output signals of the power amplifier 108 are coupled to the feedback path to form a feedback signal. The inverse mixer 109 mixes the feedback signal and carrier of the local oscillator 107 to generate signals with reduced frequency. The ADC 110 receives the output signals of the inverse mixer 109 and transforms them into digital signals. The adaptive operation unit 111 receives the digital signals and the output signals of the delay unit 115, and conducts an adaptive operation. The inverse shaping filter 112 receives the output signals of the adaptive operation unit 111 and conducts an inverse operation of the shaping filter 103. The inverse compandor 113 receives the output signals of the shaping filter 103, and conducts an inverse operation of the compandor 102. The comparator 114 receives and compares the output signals of the compandor 102 and inverse compandor 113 so as to adjust parameters of the compandor 102 and inverse compandor 113.

The predistortor 104, delay unit 115 and adaptive operation unit 111 constitute a predistortion mechanism to adjust parameters of the predistortor 104. The operation of the predistortor 104 is used to offset the non-linear part of the power amplifier 108. A look-up table can be used to facilitate the offset operation. The interval of the entries in the look-up table can be adjusted based on statistical properties of the transmitted signals. In other words, the signals with high probability exhibit denser intervals, and thus the efficiency of the predistortion is increased. In addition, the predistortion feedback mechanism adaptively adjusts parameters of the predistortor 104 by minimum mean square error (MMSE) calculation based on the non-linear relationship and statistical properties of the transmitted signals.

The compandor 102, inverse compandor 113 and comparator 114 constitute a companding feedback mechanism so as to adjust parameters of the compandor 102. The compandor 102 serves to reduce the PAPR of the transmitted signals. The companding feedback mechanism adjusts parameters of the compandor 102 and the inverse compandor 113 in accordance with the substantively amplifying power generated by the power amplifier 108 and the predistortion feedback mechanism. The parameter adjustment is performed by the comparator 114 in accordance with the transmitted signals and restored transmitted signals, i.e., signals from the inverse compandor 113.

The predistortion feedback mechanism and companding feedback mechanism alternatively adjust their parameters. In other words, the parameters of the predistortion feedback mechanism are fixed first, and then the parameters of the companding feedback mechanism are adjusted. The steps are repeated until the parameters converge. Alternatively, the parameters of the companding feedback mechanism are fixed first, and then the parameters of the predistortion feedback mechanism are adjusted.

Figure 2:
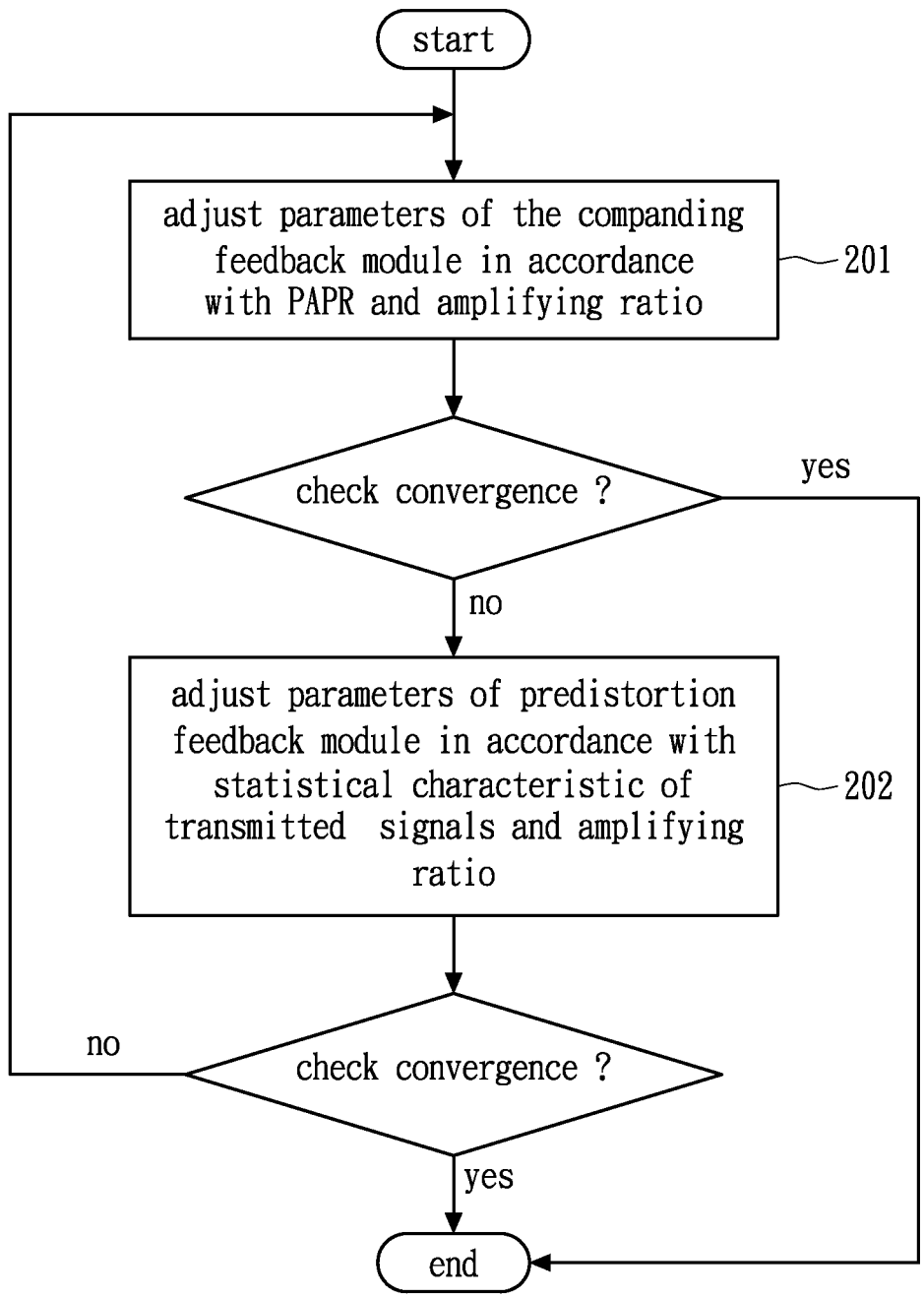
FIG. 2 shows a flow chart of parameter adjustments on the signal transmitting apparatus in accordance with one embodiment of the present invention.

FIG. 2 shows a flow chart of parameter adjustments on the signal transmitting apparatus including a power amplifier in accordance with one embodiment of the present invention. In step 201, a companding feedback module adjusts parameters of the companding feedback module based on the PAPR of the transmitted signals and substantive power amplification of the power amplifier. In step 202, a predistortion feedback module adjusts the parameters of the predistortion feedback module based on the statistical properties of the transmitted signals and power amplification of the power amplifier.

The present predistortion operation is not limited to any specific structure or steps, and the present companding method is not limited to any specific structure or steps. Therefore, the present invention is flexible. The present invention alternatively calculates the parameters of the two mechanisms, and also simultaneously considers non-ideal effects when conducting the calculation. Therefore, by contrast with the prior art, the present invention can offset non-ideal effects of the system more easily. In addition, the present invention finds the best solution for the entire system, and exhibits better efficiency in contrast with the prior art. In conclusion, the present invention is suitable for OFDM signal transmission apparatus, especially for IEEE 802.11a/g/n devices.

The above-described embodiments of the present invention are intended to be illustrative only. Numerous alternative embodiments may be devised by persons skilled in the art without departing from the scope of the following claims.

What is claimed is:

1. A signal transmitting apparatus for orthogonal frequency division multiplexing (OFDM) system, comprising:
   a compandor configured to compress and expand a transmitted signal;
   a predistortor configured to perform a predistortion operation on an output signal of the compandor;
   a power amplifier configured to amplify an output signal of the predistortor; and
   a feedback module configured to adjust the compandor and the predistortor based on a feedback signal;
   wherein the feedback module comprises:
   a delay unit configured to delay an input signal of the predistortor;
   an adaptive operation unit configured to adjust parameters of the predistortor based on an output signal of the delay unit and the feedback signal;
   an inverse compandor configured to perform an inverse operation of the compandor on an output signal of the adaptive operation unit; and
   a comparator configured to adjust parameters of the compandor and inverse compandor based on a comparison result of the output signal of the compandor and an output signal of the inverse compandor.

2. The signal transmitting apparatus of claim 1, wherein the compandor compresses and expands the transmitted signal based on a substantively amplifying power generated by the predistortor and the power amplifier.

3. The signal transmitting apparatus of claim 1, wherein the predistortor performs a predistortion operation based on statistical properties of the transmitted signal and amplifying ratio of the power amplifier.

4. The signal transmitting apparatus of claim 1, wherein the predistortion operation is performed based on a look-up table.

5. The signal transmitting apparatus of claim 1, wherein the feedback signal is generated by an output signal of the power amplifier coupled to the feedback signal.

6. The signal transmitting apparatus of claim 1, wherein the adaptive operation unit adjusts the parameters of the predistortor based on a minimum mean square error operation.

7. The signal transmitting apparatus of claim 1, further comprising a shaping filter, the shaping filter connecting the compandor and the predistortor for transforming the output signal of the compandor into a transmitted signal of the OFDM system and outputting the transmitted signal to the predistortor.

8. The signal transmitting apparatus of claim 7, wherein the feedback module comprises an inverse shaping filter, the inverse shaping filter connecting the adaptive operation unit and the inverse compandor for performing an inverse operation of the shaping filter on the output signal of the adaptive operation unit and outputting a result to the inverse compandor.

9. The signal transmitting apparatus of claim 1, wherein the adaptive operation unit and the comparator alternatively adjust the parameters of the compandor and the predistortor.

10. The signal transmitting apparatus of claim 1, which is applied to a wireless network system complying with IEEE 802.11 standard.

11. A signal transmitting apparatus for orthogonal frequency division multiplexing (OFDM) system, comprising:
a companding feedback module configured to compress and expand a transmitted signal;
a predistortion feedback module configured to perform a predistortion operation on an output signal of the companding feedback module and to output a feedback signal to the companding feedback module; and
a power amplifier configured to amplify an output signal of the predistortion feedback module and to couple the amplified signal to the predistortion feedback module;
wherein the companding feedback module comprises:
a compandor configured to compress and expand the transmitted signal;
an inverse compandor configured to perform an inverse operation of the compandor on the feedback signal; and
a comparator configured to adjust the compandor and the inverse compandor based on a comparison result of output signals of the compandor and the inverse compandor;
wherein the companding feedback module and the predistortion feedback module alternatively adjust their parameters.

12. The signal transmitting apparatus of claim 11, wherein the predistortion feedback module comprises:
a predistortor configured to perform the predistortion operation on the output signal of the companding feedback module;
a delay unit configured to delay an input signal of the predistortor; and
an adaptive operation unit configured to adjust the predistortor based on an output signal of the delay unit and the amplified signal.

13. The signal transmitting apparatus of claim 12, wherein the predistortor performs a predistortion operation based on statistical properties of the transmitted signal and amplifying ratio of the power amplifier.

14. The signal transmitting apparatus of claim 12, wherein the predistortion operation is performed based on a look-up table.

15. The signal transmitting apparatus of claim 11, wherein the compandor compresses and expands the transmitted signal based on a substantively amplifying power generated by the predistortor and the power amplifier.

16. A method for adjusting parameters of a signal transmitting apparatus for orthogonal frequency division multiplexing (OFDM) system of claim 11, comprising the steps of:
adjusting the companding feedback module based on a peak to average power ratio of the transmitted signal and an amplifying ratio of a power amplifier included in the signal transmitting apparatus; and
adjusting the predistortion feedback module based on statistical properties of the transmitted signal and the amplifying ratio of the power amplifier;
wherein the companding feedback module and the predistortion feedback module alternatively adjust until convergence.

17. The method of claim 16, wherein the predistortion feedback module adjusts based on the feedback signal.

18. The method of claim 17, wherein the predistortion feedback module adjusts in an adaptive manner.

* * * * *